(12) United States Patent
Gofuku et al.

(10) Patent No.: US 8,182,575 B2
(45) Date of Patent: May 22, 2012

(54) PRODUCING METHOD OF DIRECT REDUCED IRON (75) Inventors: Hiroki Gofuku, Tokyo (JP); Yuki Kuwauchi, Tokyo (JP); Wataru Nagai, Tokyo (JP); Kazuhisa Fukuda, Tokyo (JP); Takashi Sawai, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 62 days.

(21) Appl. No.: 12/682,935

(22) PCT Filed: Oct. 16, 2008

(86) PCT No.: PCT/JP2008/068738
§ 371 (c)(1),
(2), (4) Date: Apr. 14, 2010

(87) PCT Pub. No.: WO2009/051172
PCT Pub. Date: Apr. 23, 2009

(65) Prior Publication Data
US 2010/0218646 A1    Sep. 2, 2010

(30) Foreign Application Priority Data
Oct. 19, 2007   (JP) ................... 2007-272552

(51) Int. Cl.
*C22B 1/16*   (2006.01)
*C21B 13/08*   (2006.01)
(52) U.S. Cl. ............... 75/484; 75/770; 241/24.1
(58) Field of Classification Search ........... 75/770, 75/484; 241/24.1
See application file for complete search history.

(56) References Cited

U.S. PATENT DOCUMENTS

| | | | | |
|---|---|---|---|---|
| 3,660,073 A | * | 5/1972 | Youngs et al. | ......... 75/766 |
| 6,755,888 B2 | | 6/2004 | Ibaraki et al. | |
| 7,192,552 B2 | * | 3/2007 | Ibaraki et al. | ......... 266/177 |
| 2003/0188603 A1 | | 10/2003 | Maki et al. | |
| 2004/0201140 A1 | | 10/2004 | Ibaraki et al. | |

FOREIGN PATENT DOCUMENTS

IN    1493-MUM-2008    *   9/2008

(Continued)

OTHER PUBLICATIONS

Machine translation of JP 2003-089823, published Mar. 28, 2003.*

(Continued)

*Primary Examiner* — George Wyszomierski
*Assistant Examiner* — Tima M McGurthy Banks
(74) *Attorney, Agent, or Firm* — Birch, Stewart, Kolasch & Birch, LLP (57) ABSTRACT

A producing method of direct reduced iron includes the steps of: drying an oxidized iron raw material selected from a group including iron ore and iron-making dust generated in an iron-making process to have a predetermined moisture content; mixing the oxidized iron raw material subjected to the drying step and a reducing material having a predetermined moisture content to obtain a mixture; pulverizing the mixture obtained in the mixing step for 80% minus-sieve to have a particle diameter of 70 μm to 500 μm; kneading the mixture after the moisture content of the mixture subjected to the pulverizing step is adjusted; agglomerating the mixture subjected to the kneading step to be agglomerate; and reducing the agglomerate obtained in the agglomerating step by a rotary hearth furnace to generate direct reduced iron.

4 Claims, 6 Drawing Sheets

FOREIGN PATENT DOCUMENTS

| | | |
|---|---|---|
| JP | 11-012624 A | 1/1999 |
| JP | 2001-234256 A | 8/2001 |
| JP | 2002-167624 A | 6/2002 |
| JP | 2003089823 A * | 3/2003 |
| JP | 2003-293019 A | 10/2003 |
| RU | 2 067 124 C1 | 9/1996 |

OTHER PUBLICATIONS

Russian Decision on Grant, dated Oct. 27, 2011, for Russian Application No. 2010116036/02(022782).

Korean Office Action issued on Feb. 16, 2012 in Korean Application No. 10-2010-7008777 (with English translation).

* cited by examiner

PRODUCING METHOD OF DIRECT REDUCED IRON

CROSS-REFERENCE TO RELATED APPLICATIONS

The present application is a national phase under 35 U.S.C. §371 of PCT International Application No. PCT/JP2008/068738 which has an International filing date of Oct. 16, 2008, which claims priority of Application No. 2007-272552 filed in Japan on Oct. 19, 2007 under 35U.S.C. §119, the entire contents of which are hereby incorporated by reference.

TECHNICAL FIELD

The present invention relates to a producing method of direct reduced iron.

The present application is based on Japanese patent application No. 2007-272552, filed in Japan, the contents of which are incorporated herein.

BACKGROUND ART

Converter steelmaking which uses, as a raw material, solid iron-containing cold material such as granular pig iron, mold pig iron and scrap of ironworks has been known. In the converter steelmaking, dust generated in an exclusive converter for melting and an exclusive converter for refining and containing iron as a main component is recycled.

In order to use such dust as a raw material, collected dust and a reducing material are mixed and then kneaded, they are subjected to an agglomeration process to be agglomerate, and then the agglomerate is reduced to produce direct reduced iron. Since a property of the direct reduced iron is influenced by a property of the agglomerate, various studies on the agglomerate have been conducted.

For example, the following Patent Document 1 discloses a method of obtaining agglomerate which is hard to break in an operation of a rotary hearth furnace as a direct reduction furnace by mixing and kneading a raw material of the agglomerate in a vibration mill and covering a surface of the raw material of the agglomerate with moisture.

[Patent Document 1] Japanese Unexamined Patent Application, First Publication No. 2002-167624

DISCLOSURE OF THE INVENTION

Problem to be Solved by the Invention

In the method described in Patent Document 1, it is required to adjust a moisture content by adding water to the raw material in the vibration mill to cover the surface of the raw material of the agglomerate with the moisture. However, since a pulverizing force of the vibration mill is influenced by the moisture content, it is required to pay attention to the adjustment of the moisture content to maintain the pulverizing force of the vibration mill.

The present invention was made in view of the above problem, and has an object of providing a producing method of direct reduced iron for producing direct reduced iron which is high in metallization ratio and is improved in product-making ratio.

Means for Solving the Problem

The present invention employs the following means to solve the problem and achieve the object.

(1) A producing method of direct reduced iron according to the present invention includes the steps of: drying an oxidized iron raw material selected from a group including iron ore and iron-making dust generated in an iron-making process to have a predetermined moisture content; mixing the oxidized iron raw material subjected to the drying step and a reducing material having a predetermined moisture content to obtain a mixture; pulverizing the mixture obtained in the mixing step for 80% minus-sieve to have a particle diameter of 70 μm to 500 μm; kneading the mixture after the moisture content of the mixture subjected to the pulverizing step is adjusted; agglomerating the mixture subjected to the kneading step to be agglomerate; and reducing the agglomerate obtained in the agglomerating step by a rotary hearth furnace to generate direct reduced iron.

Herein, examples of the iron-making dust generated in the iron-making process include converter dust, blast furnace dust, mill scale, electric furnace dust and the like. Examples of the reducing material include coal, coke, fine granular carbon and the like.

(2) In the producing method of direct reduced iron according to the (1), with respect to the particle diameter of the mixture subjected to the pulverizing step, the 80% minus-sieve particle diameter is preferably in the range of 150 μm to 300 μm.

(3) In the producing method of direct reduced iron according to the (1), the moisture content of the mixture subjected to the pulverizing step is preferably in the range of 1% to 3%.

(4) In the producing method of direct reduced iron according to the (1), in the kneading step, water is preferably added so that the moisture content of the mixture subjected to the pulverization is in the range of 6% to 8%.

Effect of the Invention

According to the present invention, direct reduced iron which is high in metallization ratio and is improved in product-making ratio can be produced.

DESCRIPTION OF REFERENCE NUMERALS AND SIGNS

10: IRON-CONTAINING COLD MATERIAL MELTING CONVERTER
20: DESULFURIZATION EQUIPMENT
30: REFINING CONVERTER
40: WET TYPE DUST COLLECTOR
50: FILTER PRESS

60: AGGLOMERATING DEVICE
70: DRYING FURNACE
80: DIRECT REDUCTION FURNACE
90: REDUCED IRON MELTING CONVERTER

BEST MODE FOR CARRYING OUT THE INVENTION

Hereinafter, an embodiment of the present invention will be described in detail with reference to the accompanying drawings. In the specification and the drawings of the present application, the components having substantially the same functions and configurations are denoted by the same reference numerals and their repeated description will be omitted.

Figure 1:
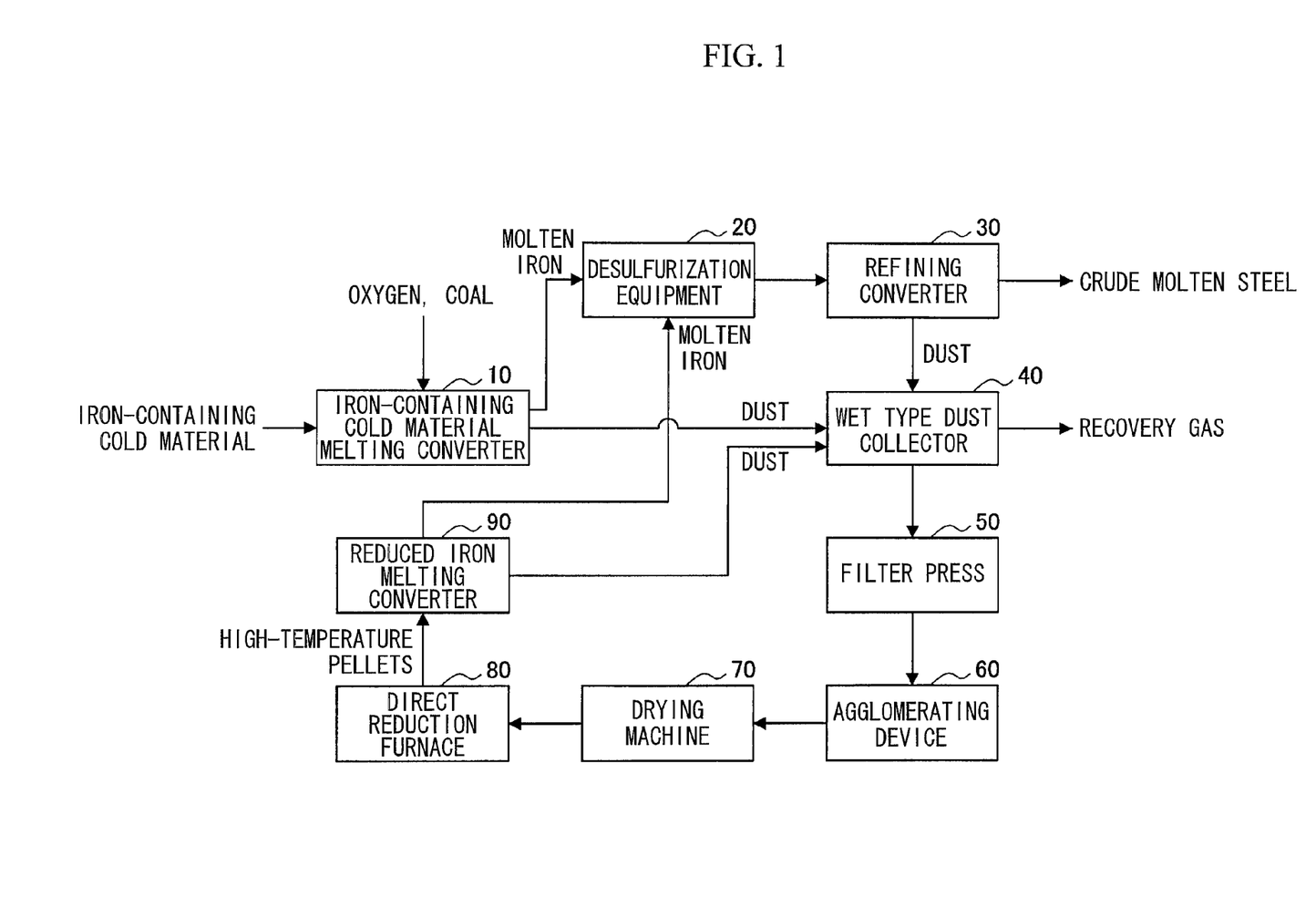
FIG. 1 is an explanatory diagram illustrating a flow of converter steelmaking.

First, the case where converter steelmaking is used as an example of a method of producing agglomerated reduced iron by a rotary hearth furnace will be described in detail with reference to FIG. 1. FIG. 1 is an explanatory diagram for illustrating a flow of the converter steelmaking.

In addition, in the following description, the case where converter dust which is iron-making dust is used as an oxidized iron raw material will be described, but it is not limited to the following example. For example, iron ore or iron-making dust such as blast furnace dust, mill scale and electric furnace dust may be used as the oxidized iron raw material.

As illustrated in FIG. 1, the converter steelmaking is performed by mainly using an iron-containing cold material melting converter 10 as a first melting converter, desulfurization equipment 20, a refining converter 30, a wet type dust collector 40, a filter press 50, an agglomerating device 60, a drying furnace 70, a direct reduction furnace 80, and a reduced iron melting converter 90 as a second melting converter.

In the iron-containing cold material melting converter 10, a solid iron-containing cold material such as granular pig iron, mold pig iron and scrap generated in ironworks is supplied, and for example, oxygen injected from an oxygen top blown lance and coal into which nitrogen gas or the like is injected as carrier gas from a bottom blown nozzle are used to melt the solid iron-containing cold material. The obtained molten iron is conveyed to the desulfurization equipment 20 to be described later by a ladle or the like. The converter dust generated together with the molten iron is collected by the wet type dust collector 40 to be described later to be recycled.

The desulfurization equipment 20 desulfurizes the molten iron generated in the iron-containing cold material melting converter 10 and the reduced iron melting converter 90 to be described later. For example, a Kanbara Reactor (KR), an injection or the like is used as the desulfurization equipment 20. The desulfurized molten iron is conveyed to the refining converter 30 to be described later.

The refining converter 30 is, for example, a top and bottom combined blown converter or the like, and decarbonizes the molten iron desulfurized by using the supplied oxygen. The decarbonized molten iron is used as crude molten steel. The converter dust generated from the refining converter 30 is collected by the wet type dust collector 40 to be recycled.

The wet type dust collector 40 is a dust collector employing, for example, an Oxygen converter Gas (OG) system and collects the converter dust generated from the iron-containing cold material melting converter 10, the refining converter 30, and the reduced iron melting converter 90. The collected converter dust is conveyed to the filter press 50.

The filter press 50 dehydrates the converter dust collected by the wet type dust collector 40. The converter dust collected by the wet type dust collector 40 is dehydrated by the filter press 50 so that a moisture content is reduced to about 20% W.B. (Wet Base). The dehydrated converter dust is conveyed to the agglomerating device 60.

While the dehydrated converter dust is conveyed to the agglomerating device 60, a carbonaceous material such as coal is added as a reducing material to the dust and they are charged into the agglomerating device 60. The agglomerating device 60 agglomerates the converter dust to which the reducing material is added and produces agglomerate such as pellets. Herein, the agglomerate is particles or aggregated materials such as pellets, briquettes, compacts formed by extrusion and cutting or aggregated materials of which a particle size is adjusted. In the agglomerating device 60, the converter dust is agglomerated to have a size not less than a particle diameter for not being scattered by a flow of furnace ascending gas, when being hot-charged into the reduced iron melting converter 90 after drying and heating-reducing to be described later. The generated agglomerate is charged into the drying furnace 70.

The drying furnace 70 dries the agglomerate so that the moisture content is adjusted so as to be suitable for the heating-reducing step to be described later (for example, 1% W.B. or less). The agglomerate of which the moisture content is adjusted to a predetermined moisture content is conveyed to the direct reduction furnace 80.

In the direct reduction furnace 80 such as a rotary hearth furnace (RHF), the charged agglomerate is heated and reduced in an air-LNG burner heating atmosphere to be direct reduced iron. The produced direct reduced iron, which is supplied in a state of for example, high-temperature pellets, is charged into the reduced iron melting converter 90. In the charging into the reduced iron melting converter 90, the produced direct reduced iron may be charged collectively or in a lump and then oxygen, coal and the like may be charged. Otherwise, the produced direct reduced iron may be sequentially charged into the reduced iron melting converter 90 supplied with the oxygen and the coal.

The reduced iron melting converter 90 melts the direct reduced iron supplied in a state of, for example, high-temperature pellets and generates molten iron. The generated molten iron is conveyed to the above-described desulfurization equipment 20 by using a ladle or the like. The converter dust generated together with the molten iron is collected by the above-described wet type dust collector 40 to be recycled.

The producing method of direct reduced iron according to the embodiment of the present invention relates to the steps ranging from the agglomerating device 60 to the direct reduction furnace 80 using the oxidized iron raw material such as the converter dust collected by the wet type dust collector 40 and dehydrated by the filter press 50.

<Oxidized Iron Raw Material>

Figure 2:
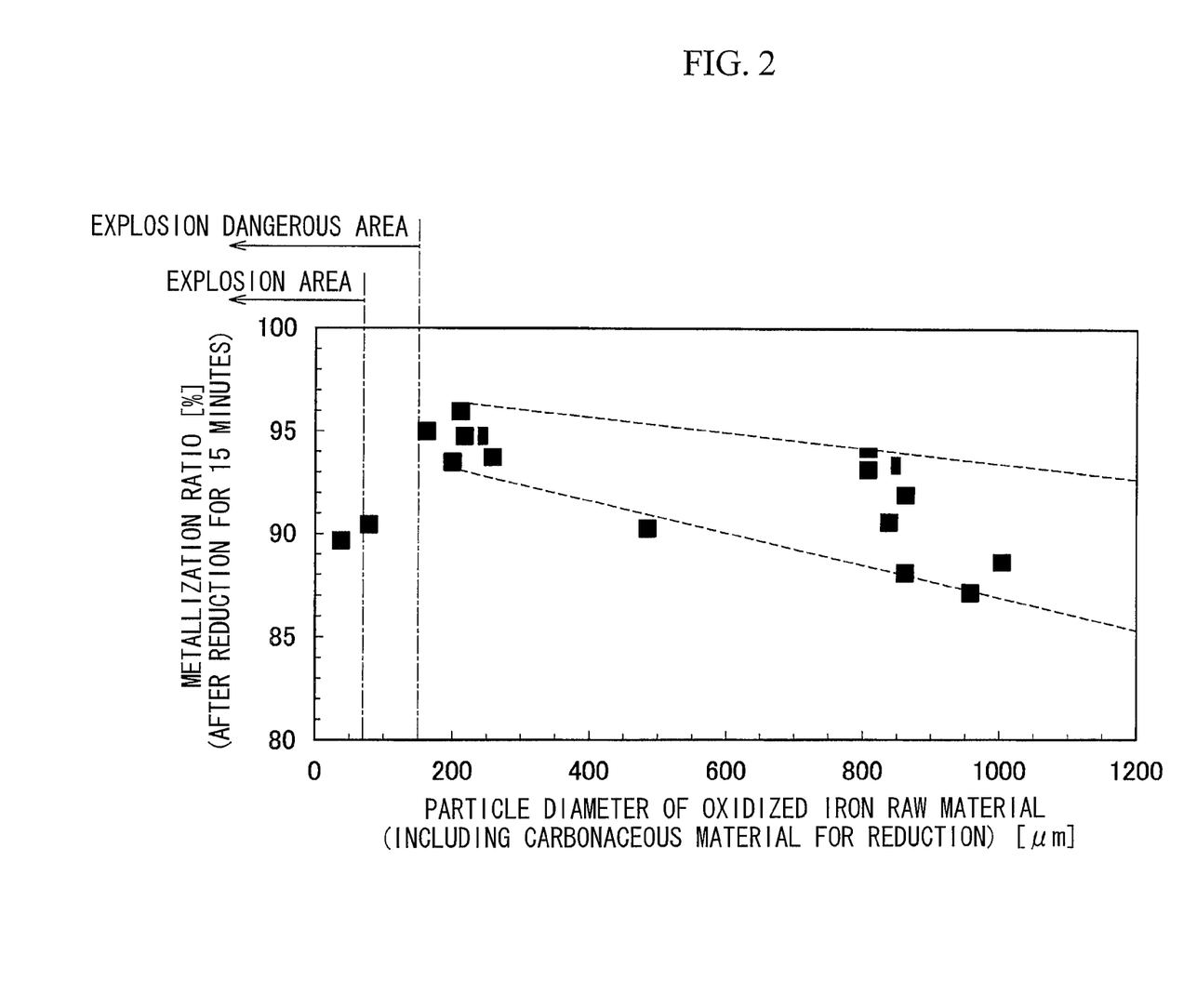
FIG. 2 is a graph illustrating a relationship between a particle diameter of an oxidized iron raw material and a metallization ratio of direct reduced iron.
Figure 3:
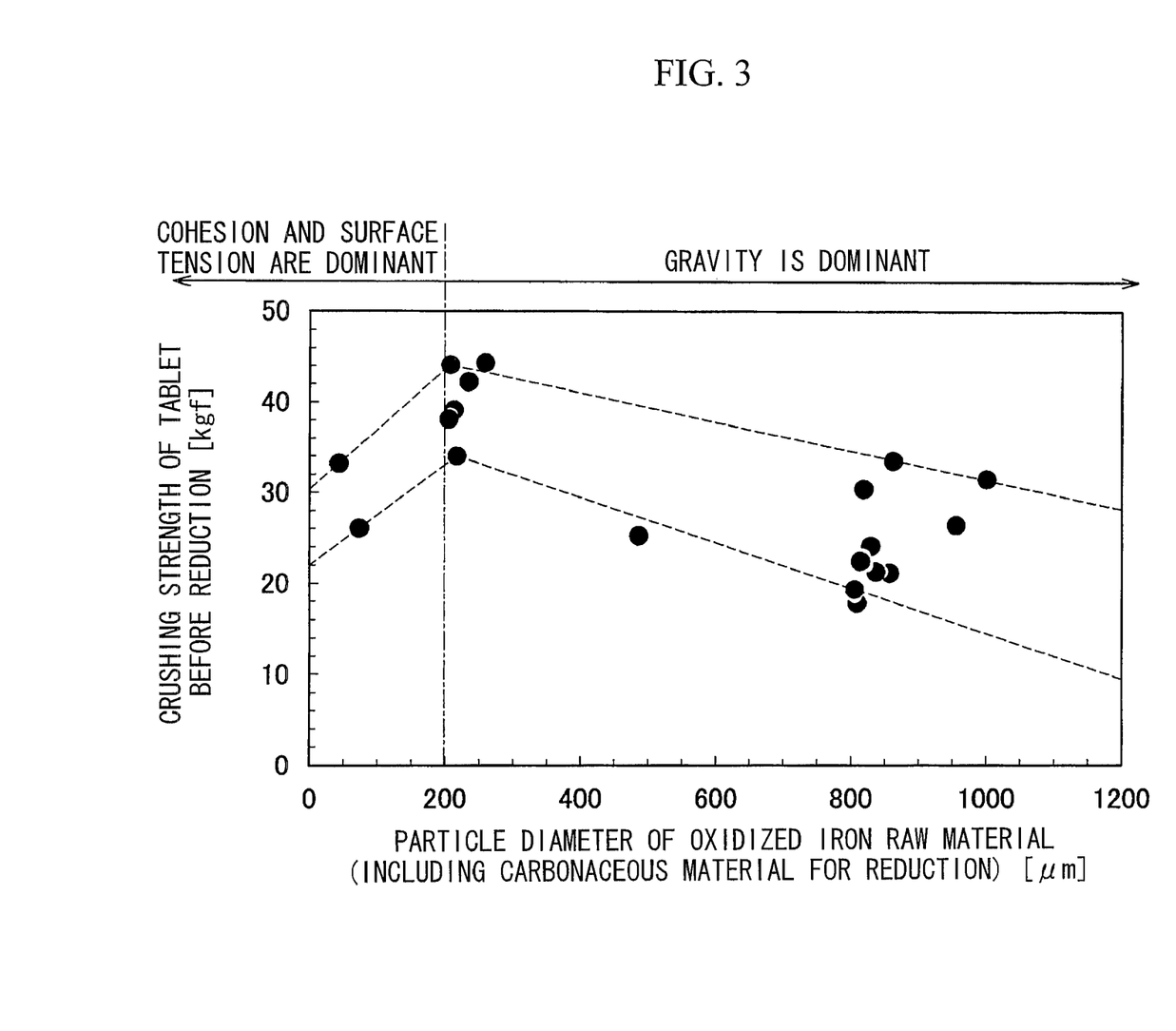
FIG. 3 is a graph illustrating a relationship between a particle diameter of the oxidized iron raw material and a crushing strength of tablets before reduction.
Figure 4:
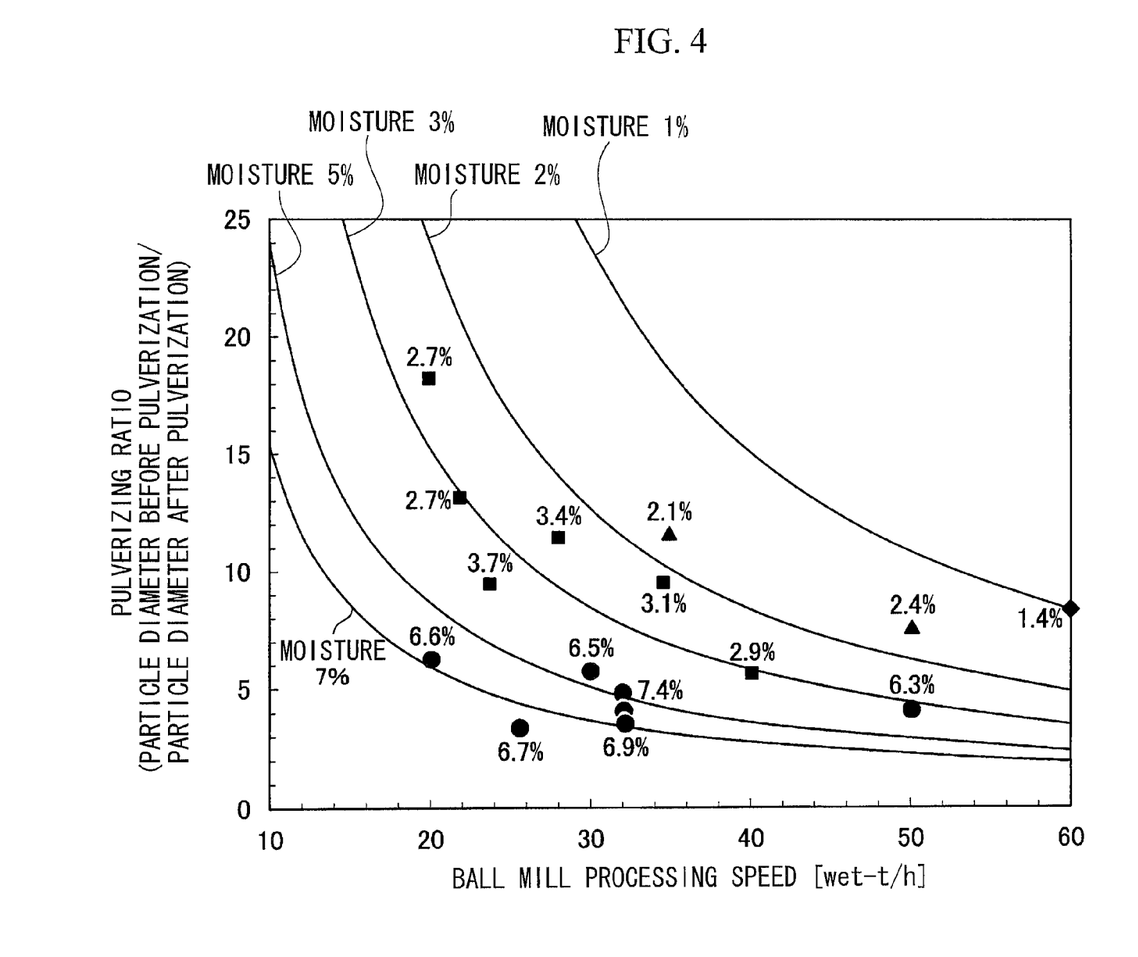
FIG. 4 is a graph illustrating a relationship between a ball mill processing speed and a pulverizing ratio.

Next, the oxidized iron raw material including the converter dust generated in the above-described converter steelmaking will be inspected in detail with reference to FIGS. 2 to 4. In the following description, the case where a ball mill which is a kind of vibration mill is used as a pulverizer which is used for pulverizing the oxidized iron raw material will be described, but the producing method of direct reduced iron according to the present invention is not limited to the following case.

FIG. 2 is a graph illustrating a relationship between a particle diameter of the oxidized iron raw material and a metallization ratio of the direct reduced iron. FIG. 3 is a graph illustrating a relationship between a particle diameter of the oxidized iron raw material and a crushing strength of tablets before reduction. FIG. 4 is a graph illustrating a relationship between a ball mill processing speed and a pulverizing ratio.

(Reducing Property Evaluation Based on Difference in Particle Diameter of Oxidized Iron Raw Material)

Tablets were actually produced and reduced in an electric furnace to perform a reducing property evaluation based on the difference in particle diameter of the oxidized iron raw material. The obtained result is illustrated in FIG. 2. FIG. 2 illustrates a relationship between a particle diameter of the oxidized iron raw material including a carbonaceous material for reduction and a metallization ratio of the direct reduced iron (DRI) obtained by heating and reducing the oxidized iron raw material. Examples of the carbonaceous material for reduction include coal, coke, fine granular carbon generated as residues during tire carbonization and the like. Referring to FIG. 2, it is found that the smaller the particle diameter of the oxidized iron raw material is, the more the metallization ratio of the direct reduced iron is improved, but the metallization ratio is adversely deteriorated when the particle diameter of the oxidized iron raw material is 150 μm or less. This is because that, as the particle diameter is reduced, a reaction interface area of the oxidized iron raw material increases and the reduction speed thereby increases. However, CO gas is generated with the progression of the reduction reaction. Thus, when the particle diameter is so small, the direct reduced iron cannot bear an inner pressure at the time of generation of the gas and explodes. Accordingly, it is thought that the metallization ratio representing the reduction property is lowered. As a result of various verifications, it is found that the risk of explosion increases when the particle diameter is less than 150 μm, and there is a high possibility of explosion when the particle diameter is not more than 70 μm.

From the result, it is found that the direct reduced iron of which the variation in metallization ratio is not more than about 6% and which is high in metallization ratio can be produced by adjusting the particle diameter of the oxidized iron raw material to, for example, 70 μm to 500 μm, and the explosion of the direct reduced iron can be suppressed by adjusting the lower limit of the particle diameter to 70 μm. In addition, it is found that the direct reduced iron of which the variation in metallization ratio is not more than about 3% and which is high in metallization ratio can be produced by adjusting the particle diameter of the oxidized iron raw material to, for example, 150 μm to 300 μm, and the explosion of the direct reduced iron can be prevented by adjusting the lower limit of the particle diameter to 150 μm.

In this manner, the direct reduced iron which is high in metallization ratio and of which the variation in metallization ratio is not more than about 6% can be produced by adjusting the particle diameter of the oxidized iron raw material to, for example, to 70 μm to 500 μm, and preferably, 150 μm to 300 μm.

(Granulation Property Evaluation Based on Difference in Particle Diameter of Oxidized Iron Raw Material)

Subsequently, tablets were actually produced and a crushing strength thereof was measured to perform a granulation property evaluation based on the difference in particle diameter of the oxidized iron raw material. The obtained result is illustrated in FIG. 3. FIG. 3 illustrates a relationship between a particle diameter of the oxidized iron raw material including a carbonaceous material for reduction and a crushing strength of the tablets before reduction, which are produced using the oxidized iron raw material. In a vertical axis of FIG. 3, the crushing strength of the tablets before reduction is represented by a unit of kgf. 1 kgf is about 9.8 N.

The crushing strength of the tablets before reduction is measured by the following method.

First, the oxidized iron raw material of which the particle size is adjusted to a predetermined particle size and the carbonaceous material for reduction are mixed and moisture of them is adjusted to 7%. After that, tablets having a substantially cylindrical shape are molded by a press. The size of the molded tablets is 30 mmφ×15 mm. Subsequently, a molded tablet is mounted on a crushing strength test device (press) to measure a press load (that is, crushing strength) when the tablet is crushed. The tablet is placed on the crushing strength test device so that a column side surface thereof faces a vertical direction (in other words, the tablet is placed so that a part of the column side surface comes into contact with the crushing strength test device) and a pressure in a downward extending direction is added to the column side surface from the upper side of the tablet.

As illustrated in FIG. 3, it is found that the crushing strength of the actually produced tablets becomes maximum when the particle diameter of the oxidized iron raw material is about 200 μm. This result shows that a bonding strength (granulation bonding strength) between the converter dust particles becomes maximum when the particle diameter of the converter dust is about 200 μm. The result can be explained as follows.

In granulation, by the cohesion and the surface tension of water entering between the oxidized iron raw material particles, the bonding strength between the particles acts and the bonding therebetween is maintained. Since the cohesion and the surface tension acting between the oxidized iron raw material particles are proportional to the particle diameter of the oxidized iron raw material, the larger the particle diameter is, the larger the cohesion and the surface tension are and the larger the crushing strength of the granulated material is. However, when the particle diameter is not less than a certain diameter, the effect of gravity acting on the particles becomes more dominant than the cohesion and the surface tension acting between the particles and thus the bonding strength is lowered.

Accordingly, in the case illustrated in FIG. 3, it is found that the cohesion and the surface tension dominantly act in the area up to about 200 μm of the particle diameter of the oxidized iron raw material and the gravity dominantly acts in the area of the particle diameter more than 200 μm.

From the result, it is found that the strength of the tablets and the variation in strength can be maintained to good conditions by adjusting the particle diameter of the oxidized iron raw material to 70 μm to 500 μm, and preferably, 150 μm to 300 μm, and the agglomerate which is hard to break can be thereby produced.

(Wettability of Oxidized Iron Raw Material)

In addition, during the granulation, it is preferable that water is added to the oxidized iron raw material to adjust the moisture content to the range of 6% to 8% which is suitable moisture for the granulation. Therefore, water absorbability of the oxidized iron raw material is important for this. Water was added to 20 g of an oxidized iron raw material placed in an evaporation dish so as to adjust a moisture content to 6% to 8% and then absorption time was measured to perform an evaluation.

As a result, when the moisture content before the addition of water was 0%, the dropped water became spherical in its shape in the case where the particle diameter of the oxidized iron raw material was less than 200 μm. Thus, the absorption speed became lower. This shows that, during the actual kneading, lumps may be generated in a kneading machine such as a mix muller for being used in kneading and may disturb the kneading. In the case where the particle diameter of the oxidized iron raw material was not less than 200 μm, the absorbability was excellent and there occurred no problem.

Further, when the moisture content before the addition of water was 1% to 3%, the dropped water became spherical in its shape in the case where the particle diameter of the oxidized iron raw material was less than 70 μm. Thus, the absorption speed became lower. In the case where the particle diameter of the oxidized iron raw material was not less than 70 μm, the absorbability was excellent and there occurred no problem.

From the results, it is found that, in the kneading step influencing the granulation property, a kneading property is deteriorated when the particle diameter of the oxidized iron raw material is too small or the oxidized iron raw material is completely dried, and it is preferable that the particle diameter is adjusted to be not less than a predetermined size to maintain the excellent kneading property.

(Pulverizing Ability of Ball Mill)

Next, a pulverizing ability of the ball mill which is a kind of vibration mill used for pulverizing the oxidized iron raw material will be inspected.

As a result of the analysis of result data of the operation actually performed, it is found that the pulverizing ability of the ball mill is affected by the moisture content of the converter dust. A formula of the pulverizing ability of the ball mill, taking into account the effect of the moisture content of the oxidized iron raw material, is calculated and the calculated formula is shown as the following Formula 1.

[Formula 1]

$$P_W = 10 \cdot W_i \cdot \left( \frac{1}{\sqrt{P}} - \frac{1}{\sqrt{F}} \right) \times C \qquad \text{(Formula 1)}$$

In the Formula 1, reference signs are as follows.
Pw: Ball mill power (kW)
Wi: Pulverization work index
P: 80% minus-sieve particle diameter on output side of ball mill (μm)
F: 80% minus-sieve particle diameter on input side of ball mill (μm)
C: Correction coefficient in accordance with ball mill The collection coefficient C includes a correction coefficient in accordance with the moisture content and a correction coefficient related to a processing speed of the ball mill.

Figure 5:
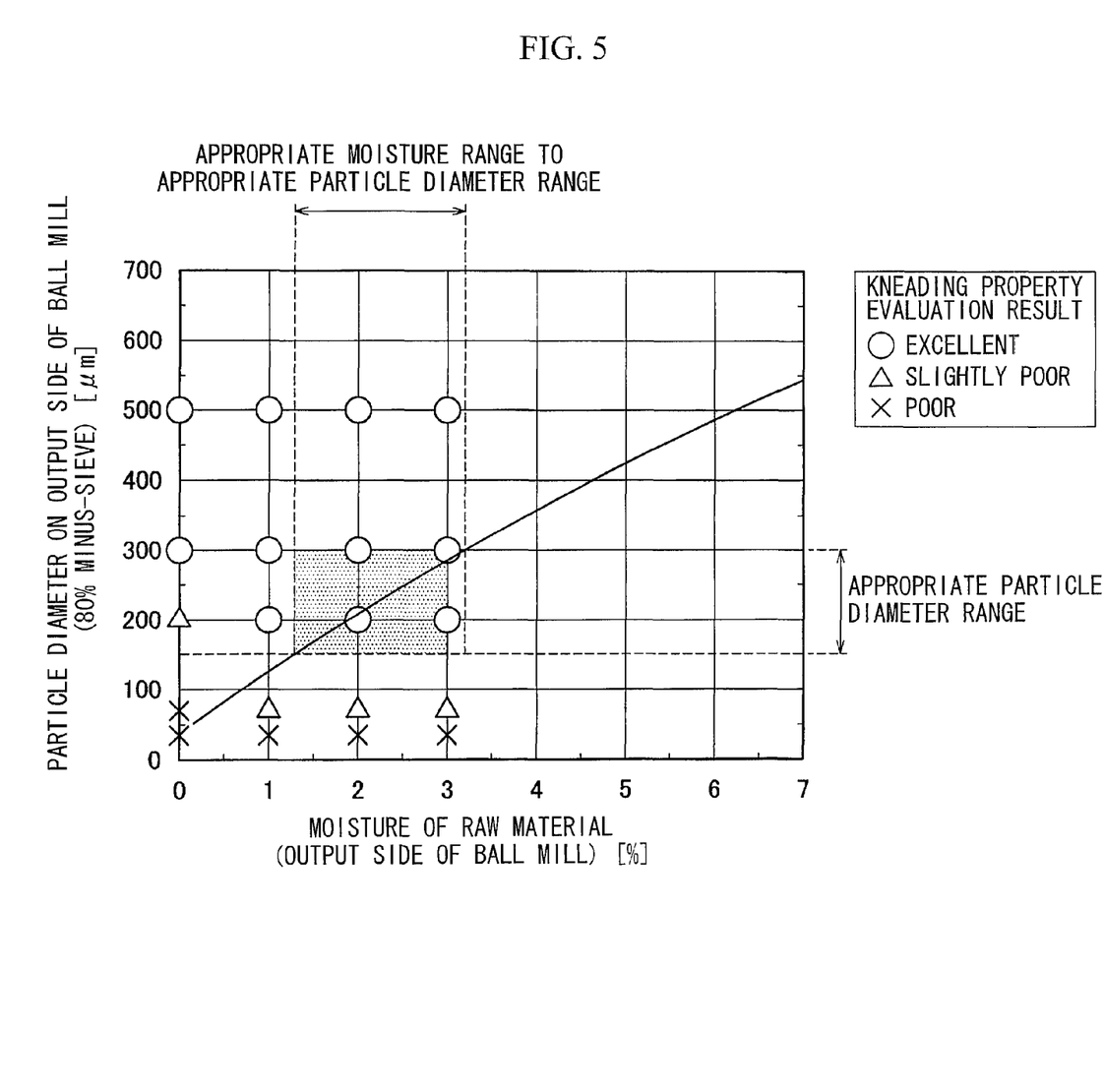
FIG. 5 is a graph illustrating a relationship between a moisture content of the oxidized iron raw material and a particle diameter on the output side of a ball mill.

For example, when a relationship between the 80% minus-sieve particle diameter on the output side of the ball mill and the moisture content of the oxidized iron raw material on the output side of the ball mill when the processing speed of the ball mill of which Pw is 350 kW is 30 (wet-t/h) is calculated based on the above Formula 1, a curve illustrated in FIG. 5 to be described later is drawn. As is obvious from FIG. 5, it is found that the lower the moisture content on the output side of the ball mill is, the smaller the particle diameter on the output side of the ball mill is Accordingly, it is found that it is required to arbitrarily adjust the moisture content of the oxidized iron raw material to adjust the particle diameter on the output side of the ball mill to a desirable value.

Next, a relationship between the processing speed of the ball mill and a pulverizing ratio is calculated based on the above Formula 1 and the result thereof is illustrated in FIG. 4. In FIG. 4, theoretical curves when the moisture content on the output side of the ball mill is 1% to 7% are represented by a full line. The plot in the drawing is the result of a practical test. Herein, the pulverizing ratio is a value defined by (particle diameter before pulverization/particle diameter after pulverization) and it is shown that the larger the pulverizing ratio is, the higher the pulverizing ability of the ball mill is.

Referring to the theoretical curves of FIG. 4, it is found that, at the same processing speed of the ball mill, the lower the moisture content on the output side of the ball mill is, the larger the pulverizing ratio is. In addition, it is found that, at the constant moisture content, the lower the processing speed of the ball mill is, the larger the pulverizing ratio is. Moreover, as is obvious from FIG. 4, it is found that the behaviors of the theoretical curves are excellently coincident with the result of the practical test. From FIG. 4, it is found that it is required to arbitrarily adjust the moisture content of the oxidized iron raw material to adjust the particle diameter on the output side of the ball mill to a desirable value.

The result of the above inspection shows that it is preferable that the moisture content of the oxidized iron raw material is ensured in the range of at least about 1% to 3% as a condition for the kneading property, it is preferable that the particle diameter is in the range of about 70 μm to 500 μm as a condition for the granulation, and it is preferable that the particle diameter is not less than 150 μm as a condition for reduction in consideration of the risk of explosion. These conditions are put together as illustrated in FIG. 5. FIG. 5 is a graph illustrating the appropriate moisture and the appropriate particle diameter in the case where a processing speed of the ball mill of which Pw is 350 kW is adjusted to 30 (wet-t/h). In FIG. 5, a line of the pulverizing ability of the ball mill on the above processing conditions is shown together with the actual kneading property evaluation result. When considering the line of the pulverizing ability of the ball mill in addition to the condition for the kneading property, the condition for the granulation and the condition for the reduction, it is found that excellent direct reduced iron can be produced by adjusting the moisture content of the converter dust to about 1% to 3% (for example, about 1.5% to 3.5%) with a particle size range of about 150 μm to 300 μm, as is obvious from FIG. 5.

<Producing Method of Direct Reduced Iron According to this Embodiment>

Figure 6:
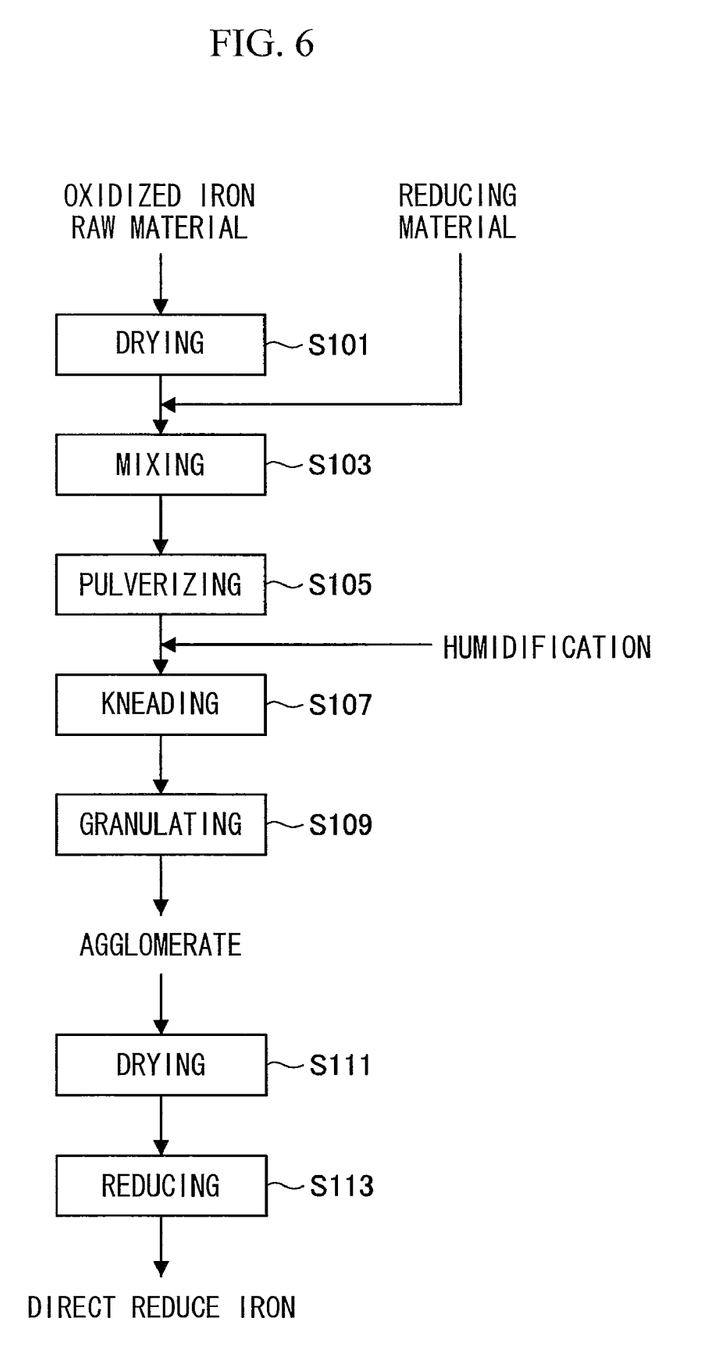
FIG. 6 is a flowchart illustrating a producing method of direct reduced iron according to an embodiment of the present invention.

Next, the producing method of direct reduced iron according to this embodiment will be described in detail with reference to FIG. 6. FIG. 6 is a flowchart illustrating the producing method of direct reduced iron according to this embodiment.

In the producing method of direct reduced iron according to this embodiment, first, an oxidized iron raw material selected from a group including iron ore and iron-making dust generated in an iron-making process (for example, converter dust, blast furnace dust, mill scale, electric furnace dust and the like generated in iron-containing cold material melting converter, refining converter and dust melting converter and collected by wet type dust collector) is dried by using a drying machine such as a rotary kiln (Step S101). The converter dust charged into the drying machine has a particle diameter of about 3 mm to 4 mm (80% minus-sieve particle diameter) and the moisture content thereof is about 12% W.B. to 18% W.B. The oxidized iron raw material is dried by the drying machine so that the moisture content is adjusted to about 6%.

The dried oxidized iron raw material is mixed with a reducing material (for example, coal such as powdered coal, coke, fine granular carbon and the like) (Step S103) and charged into a pulverizer. As the above powdered coal, for example, a material of which the 80% minus-sieve particle diameter is about 5 mm to 10 mm and the moisture content is about 8% W.B. to 12% W.B. can be used. A mixing ratio of the oxidized iron raw material and the reducing material is adjusted in consideration of conditions suitable for obtaining the excellent direct reduced iron in the reducing step to be described later. For example, a mass ratio of the oxidized iron raw material and the reducing material can be adjusted to about 90:10. The mixture has a particle diameter of about 4 mm when being charged into the pulverizer.

Next, the mixture of the oxidized iron raw material and the reducing material is pulverized by the pulverizer (Step S105) so as to have a particle diameter of 70 μm to 500 μm (80% minus-sieve particle diameter), preferably 150 μm to 300 μm, and more preferably about 200 μm. As the pulverizer for pulverizing the mixture, a vibration mill such as a ball mill or a rod mill can be used. In order to adjust the particle diameter and the moisture content of the mixture on the output side of the vibration mill such as the ball mill to the above-described range and about 2% or less, respectively, a processing speed of the vibration mill can be determined by using, for example, the graph illustrated in FIG. 4. Specifically, a pulverizing ratio is calculated from a targeted value of the particle diameter on the output side of the vibration mill (ball mill) and the particle diameter on the input side of the vibration mill (ball mill) and the processing speed of the vibration mill can be determined from the calculated pulverizing ratio and a theoretical curve of a targeted value of the moisture content on the output side of the vibration mill.

In addition, in the producing method of direct reduced iron according to this embodiment, by drying the oxidized iron raw material before mixing, the moisture content of the mixture when being charged into the pulverizer can be maintained to a value at which the vibration mill exhibits an appropriate pulverizing property. Accordingly, it is not required to constantly change the control of the vibration mill during the pulverization. Further, even if the moisture content of the oxidized iron raw material varies upward or downward by various reasons, the pulverizing property of the vibration mill can be maintained to a suitable value by properly controlling the setting of the drying machine at the time of drying before mixing.

Moreover, in the producing method of direct reduced iron according to this embodiment, since the particle diameter of the mixture after pulverization allows a crushing strength suitable for the granulation process to be exhibited, direct reduced iron which is hard to break and is high in metallization ratio can be produced by using the mixture after pulverization.

When the pulverization of the mixture is completed, the pulverized mixture is charged into a kneading machine such as a mix muller. Water is added to the mixture so that the moisture content is adjusted to a value (for example, about 6% to 8%) suitable for kneading, and then the mixture is kneaded (Step S107). When the mixture is charged, the moisture content of the mixture is adjusted to a value showing appropriate wettability (that is, value showing appropriate absorbing speed). Accordingly, the kneading process can be performed without damaging an excellent kneading property.

When the kneading of the kneading machine is completed, the mixture is charged into an agglomerating device such as a pan pelletizer (disc pelletizer), a double roll compressor (briquetting machine) or an extruder and then is granulated to be agglomerate (Step S109).

The generated agglomerate is dried by the drying machine to have a moisture content of, for example, 1% or less (Step S111). The dried agglomerate is charged into a direct reduction furnace such as a RHF and then reduced (Step S113). Since the agglomerate according to this embodiment exhibits an excellent crushing strength, the agglomerate is hard to break and can be sufficiently reduced in the direct reduction furnace in the reducing step. For example, when the RHF is used as the direct reduction furnace, for example, a temperature in the furnace can be set to about 1350° C. and a speed of a rotary bed can be set so that the reducing process is completed in about 15 minutes. By performing the reducing process, direct reduced iron (DRI) which is hard to break and is high in metallization ratio can be produced.

As described above, according to the producing method of direct reduced iron of this embodiment, direct reduced iron (DRI) which is hard to break and is high in metallization ratio can be produced. Thus, the unit requirement of oxygen of the reduced iron melting converter can be improved and productivity of molten iron can be maintained in a high level.

EXAMPLES

Hereinafter, the producing method of direct reduced iron according to the present invention will be further described with an example and comparative examples according to the present invention. The following example is a specific example of the present invention and the present invention is not restricted only to the following example.

In the example and the comparative examples described as follows, direct reduce iron was produced in accordance with the sequence illustrated in FIG. 6. A rotary kiln type drying machine was used in the drying step (Step S101), a ball mill (3.5 mφ×5.4 mL, Pw: 520 kW) was used in the pulverizing step (Step S105), and a mix muller was used in the kneading step (Step S107). In addition, a double roll compressor was used in the granulating step (Step S109), a band drying machine was used in the drying step (Step S111), and a rotary hearth furnace having an outer diameter of 22 m, an inner diameter of 14 m, and a working width of 3.5 m was used in the reducing step (Step S113).

In the reducing step in the rotary hearth furnace, a speed of the rotary furnace was set to 15 minute/rotation and a temperature in the furnace was set to 1000° C. to 1350° C. Liquid natural gas (LNG) was used as fuel gas.

A mixing mass ratio and a particle diameter (80% minus-sieve particle diameter) of a raw material used in the example and comparative examples are shown in the following Table 1. By using the mixture shown in Table 1, moisture of the raw material on the input side of the ball mill was changed and particle diameters after a pulverizing step, briquette strengths after a granulating step and metallization ratios after a reducing step were measured. The result is shown in Table 2. The particle diameters shown in the following Table 1 and Table 2 are a diameter of a sieve mesh with which the mass of the minus sieve sieved using a plurality of sieves having different mesh sizes becomes 80%.

TABLE 1

|  | Oxidized iron raw material | | Carbonaceous material |
| --- | --- | --- | --- |
|  | Converter dust | Blast furnace dust | Anthracite coal |
| Mixing ratio | 81% | 10% | 9% |
| Particle size (80% minus-sieve) | 3.0 mm | 3.9 mm | 7.0 mm |
|  | Average 3.4 mm | | |

TABLE 2

| | Example | Comparative example 1 (too dried) | Comparative example 2 (insufficiently dried) |
|---|---|---|---|
| Moisture of raw material — Input side of ball mill | 6.3% W.B. | 3.9% W.B. | 9.1% W.B. |
| Moisture of raw material — Output side of ball mill | 1.7% W.B. | 0.2% W.B. | 4.3% W.B. |
| Raw material particle size on output side of ball mill | 212 μm | 67 μm | 662 μm |
| Drop strength after granulation | 20 times or more | 14 times | 18 times |
| Metallization ratio after reduction | 86% | 81% | 79% |

For the drop strengths after granulation in the Table 2, agglomerate (briquette) obtained by the granulating step is repeatedly dropped on a rubber plate from a height of 450 mm and the number of dropping when the briquette is broken is represented as the strength.

Referring to the Table 2, in the example, it is found that the particle diameter of the pulverized material can be preferably controlled by controlling the moisture content on the input side of the ball mill and the moisture content on the output side of the ball mill. In addition, it is found that the granulated material has excellent strength, as shown by the fact that the drop strength after granulation is 20 times or more. By using such a granulated material, high-quality direct reduced iron which has a metallization ratio after reduction of 86%, that is, which is high in metallization ratio, can be produced.

In the comparative example 1 in which the moisture of the raw material was sufficiently dried, since the raw material is too dried, the particle size of the raw material on the output side of the ball mill was less than 100 μm and briquettes produced by using such a raw material could not maintain a sufficient strength. A metallization ratio of direct reduced iron produced by using such briquettes was 81%. In terms of the result, the metallization ratio was deteriorated than that of the direct reduced iron according to this embodiment.

In addition, in the comparative example 2 in which the moisture of the raw material was not sufficiently dried, since the raw material was not sufficiently dried, the particle size of the raw material on the output side of the ball mill was more than 600 μm. A metallization ratio of direct reduce iron produced by using such a raw material was 79%. In terms of the result, the metallization ratio was deteriorated than that of the direct reduced iron according to this embodiment.

As above, the preferred embodiments of the present invention have been described with reference to the accompanying drawings. However, needless to say, the present invention is not limited to such examples. It is to be understood for those skilled in the art that various modifications and changes may be made and obtained in a category described in Claims, without departing from the technical scope of the present invention.

INDUSTRIAL APPLICABILITY

According to the present invention, direct reduced iron which is high in metallization ratio and is improved in product-making ratio can be produced.

The invention claimed is:

1. A producing method of direct reduced iron comprising the steps of:
    drying an oxidized iron raw material selected from the group consisting of iron ore and iron-making dust generated in an iron-making process to have a predetermined moisture content;
    mixing the oxidized iron raw material subjected to the drying step and a reducing material having a predetermined moisture content to obtain a mixture;
    pulverizing the mixture obtained in the mixing step for 80% minus-sieve to have a particle diameter of 70 μm to 500 μm;
    adjusting the moisture content of the mixture subjected to the pulverizing step;
    kneading the mixture subjected to the adjusting step;
    agglomerating the mixture subjected to the kneading step to be agglomerate; and
    reducing the agglomerate obtained in the agglomerating step by a rotary hearth furnace to generate direct reduced iron.

2. The producing method of direct reduced iron according to claim 1,
    wherein with respect to the particle diameter of the mixture subjected to the pulverizing step, the 80% minus-sieve particle diameter is in the range of 150 μm to 300 μm.

3. The producing method of direct reduced iron according to claim 1,
    wherein the moisture content of the mixture subjected to the pulverizing step is in the range of 1% to 3%.

4. The producing method of direct reduced iron according to claim 1,
    wherein in the kneading step, water is added so that the moisture content of the mixture subjected to the pulverization is in the range of 6% to 8%.

* * * * *